(12) United States Patent
Hongo et al.

(10) Patent No.: US 7,175,249 B2
(45) Date of Patent: Feb. 13, 2007

(54) RECORDING APPARATUS AND ELECTRONIC APPARATUS

(75) Inventors: Masayuki Hongo, Kanagawa (JP); Hiroyuki Tamaki, Kanagawa (JP); Shinji Takagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 393 days.

(21) Appl. No.: 10/859,338

(22) Filed: Jun. 3, 2004

(65) Prior Publication Data
US 2004/0246509 A1 Dec. 9, 2004

(30) Foreign Application Priority Data

| | | | |
|---|---|---|---|
| Jun. 6, 2003 | (JP) | | 2003-162161 |
| Jun. 6, 2003 | (JP) | | 2003-162162 |
| Jun. 6, 2003 | (JP) | | 2003-162163 |
| Sep. 3, 2003 | (JP) | | 2003-311343 |

(51) Int. Cl.
*B41J 29/393* (2006.01)

(52) U.S. Cl. .............. 347/19; 399/88; 347/41

(58) Field of Classification Search .......... 347/19, 347/41; 399/88, 89; 323/204, 205, 206
See application file for complete search history.

(56) References Cited

U.S. PATENT DOCUMENTS

2002/0060703 A1 * 5/2002 Tsukada ............. 347/5

2003/0156149 A1 * 8/2003 Choi ................ 347/19

* cited by examiner

*Primary Examiner*—Lamson Nguyen
(74) *Attorney, Agent, or Firm*—Fitzpatrick, Cella Harper & Scinto

(57) ABSTRACT

There is provided a recording apparatus for receiving recording data from an electronic apparatus or a host computer activated by being supplied with a power source through an interface, and performing a recording operation on a recording medium by the use of a recording head. This recording apparatus comprises power source supplying means for supplying predetermined electric power to the electronic apparatus, detecting means for detecting that the electronic apparatus has been connected, and control mans for changing over the control of the recording operation when the detecting means has detected the connection or non-connection of the electronic apparatus.

Also, there is provided an electronic apparatus for effecting communication with a first external device activated by being supplied with a power source through a first interface and a second external device connected thereto through a second interface, and performing an operation. This electronic apparatus comprises power source supplying means for supplying predetermined electric power to the first external device, detecting means for detecting that the first external device has been connected, and control means for changing over the control of the operation when the detecting means has detected the connection or non-connection of the first external device.

9 Claims, 14 Drawing Sheets

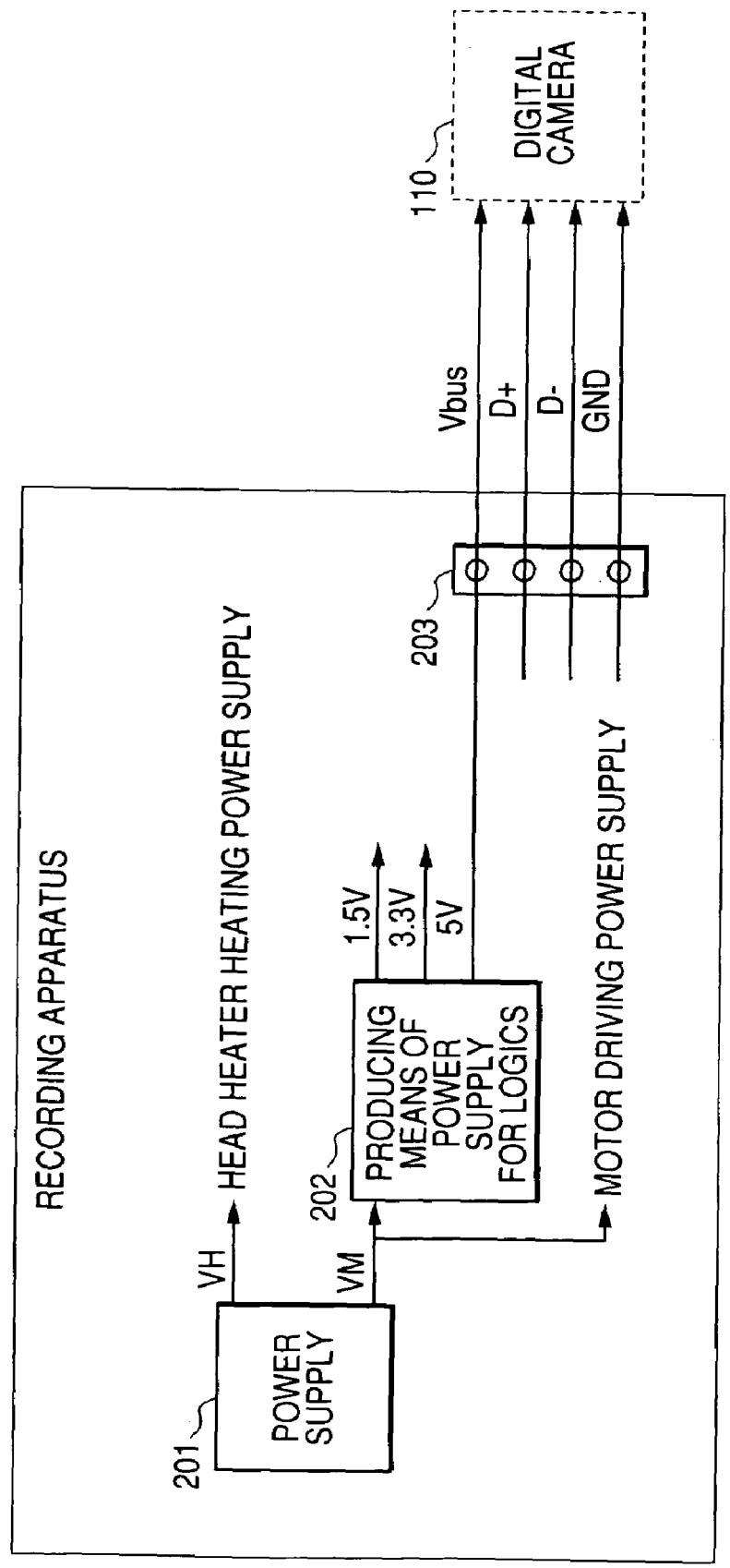

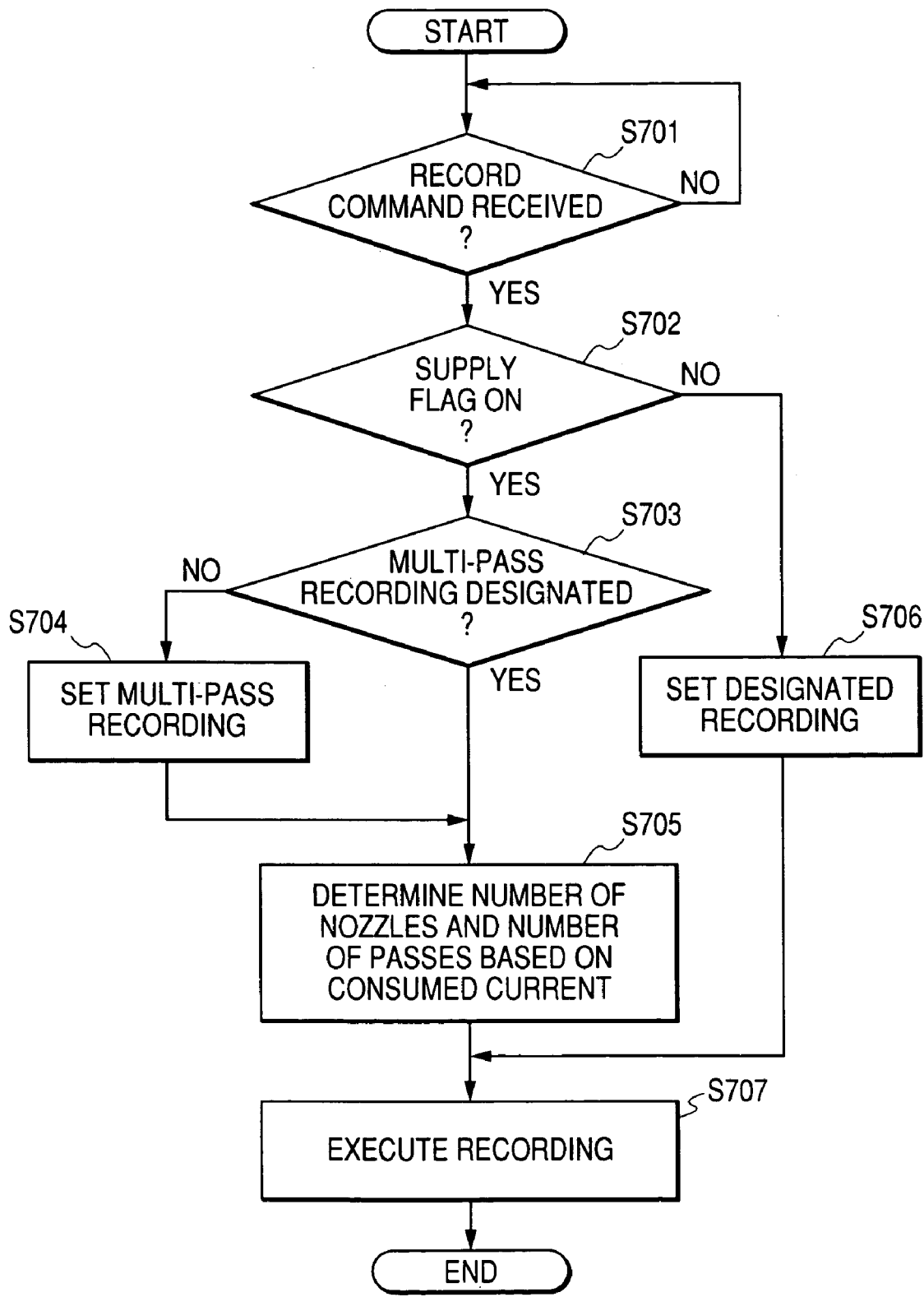

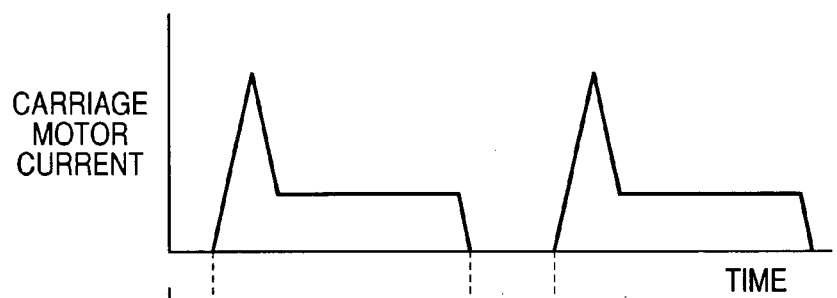
FIG. 8A CARRIAGE MOTOR CURRENT
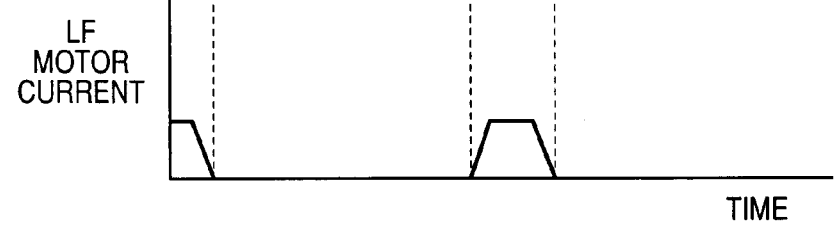
FIG. 8B LF MOTOR CURRENT
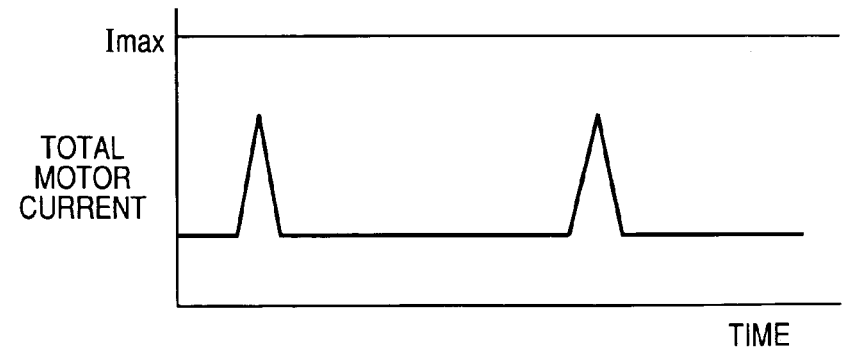
FIG. 8C TOTAL MOTOR CURRENT

RECORDING APPARATUS AND ELECTRONIC APPARATUS

BACKGROUND OF THE INVENTION

1. Field of the Invention

This invention relates to an electronic apparatus, and particularly to an apparatus for effecting electric power supply to an apparatus connected thereto.

2. Related Background Art

With the spread of personal computers, digital cameras, etc., the higher definition of recording apparatuses such as printers for recording image data of a digital type has been advanced. Among the recording apparatuses, an ink jet recording apparatus using a recording head of an ink jet type has rapidly spread, and there is demand for one which realizes images of high definition and is low in price.

In an ink jet recording apparatus of a serial scan type, Recording is effected while a recording head is scanned in a direction (main scanning direction orthogonal to the conveying direction of a recording medium such as recording paper, and at a stage whereat one scan of recording has been finished, the recording medium is conveyed, and by the repetition thereof, an image is formed.

In recent years, user's demand for printing in a recording apparatus directly from a digital camera without the intermediary of a host computer has become high, and the direct printing function of effecting print directly from an apparatus provided with an image pickup element such as a digital camera onto a recording apparatus has become a function necessary for the recording apparatus.

Heretofore, in a recording apparatus supporting the direct printing function, USB has been used as an interface. One of the features of USB is that it can supply a power source from a host side to a peripheral device (USB device) through a USB cable. The supplied electric current is 500 mA at maximum per peripheral device. There has been adopted a construction in which the recording apparatus is provided with the function of a USB host and, it is connected to a digital camera as a USB device (function), but connectable digital cameras have been restricted. These connectable digital cameras have been of the so-called self power type operable even without a power source being supplied from the USB host.

Therefore, as the recording apparatus, it has been enough if it has the capability of supplying an electric current of 100 mA or less to Vbus which is the power supply line of USB. Also, if the connected USB device has pulled up 100 mA or greater from the Vbus, it has been detected that 100 mA or greater has been pulled up, and the Vbus has been forcibly disconnected. The electric current supplied by the Vbus is small, and therefore, a load to the power source of the recording apparatus is light. Accordingly, in a case where a digital camera is connected to the USB host and in a case where a digital camera is not connected to the USB host, there has not occurred the necessity of changing a printing mode (recording mode) or the like for the reason of the load of the power source.

Also, in order to reduce the cost of a power supply device (power supply circuit), there has been the technique of effecting the control of a recording operation in conformity with recording data. For example, a recording duty (the value of a recording duty) is detected and is compared with a preset duty value to thereby change the recording operation. Thereby, the balance between the throughput of recording and the cost for the power supply is kept.

In recent years, however, cases where a bus power device activated by being supplied with a power source from the USB host is connected are increasing due to the diversification of USB device to be connected. Therefore, the power source capacity which must be supplied from the Vbus of a USB interface has increased. Specifically, maximum 500 mA must be capable of being supplied. In order to solve this problem, the capability of the power source of the recording apparatus can be increased, but this will result in a power source of high cost. In other words, how 500 mA can be supplied to the Vbus while the cost of the recording apparatus is suppressed is a task.

SUMMARY OF THE INVENTION

In order to solve the above task and achieve an object, the recording apparatus of the present invention is a recording apparatus for receiving recording data from an electronic apparatus or a host computer activated by being supplied with a power source through an interface, and performing a recording operation on a recording medium by the use of a recording head, comprising:

power source supplying means for supplying predetermined electric power to the electronic apparatus, detecting means for detecting that the electronic apparatus has been connected, and control means for changing over the control of the recording operation when the detecting means has detected the connection or non-connection of the electronic apparatus.

Also, in order to achieve the object, the electronic apparatus of the present invention is an electronic apparatus for effecting communication with a first external device activated by being supplied with a power source through a first interface and a second external device connected thereto through a second interface, and performing an operation, comprising:

power source supplying means for supplying predetermined electric power to the first external device;

detecting means for detecting that the first external device has been connected; and control means for changing over the control of the operation when the detecting means has detected the connection or non-connection of the first external device.

BRIEF DESCRIPTION OF THE DRAWINGS

FIG. 2 is an illustration of power source supplying means in the first, second and third embodiments.

FIG. 7 is a flow chart of the second embodiment.

FIGS. 8A, 8B and 8C show electric currents consumed by a carriage motor and a conveying motor in a third embodiment.

DESCRIPTION OF THE PREFERRED EMBODIMENTS

The present invention will hereinafter be described in detail with reference to the drawings.

First Embodiment

Figure 1:
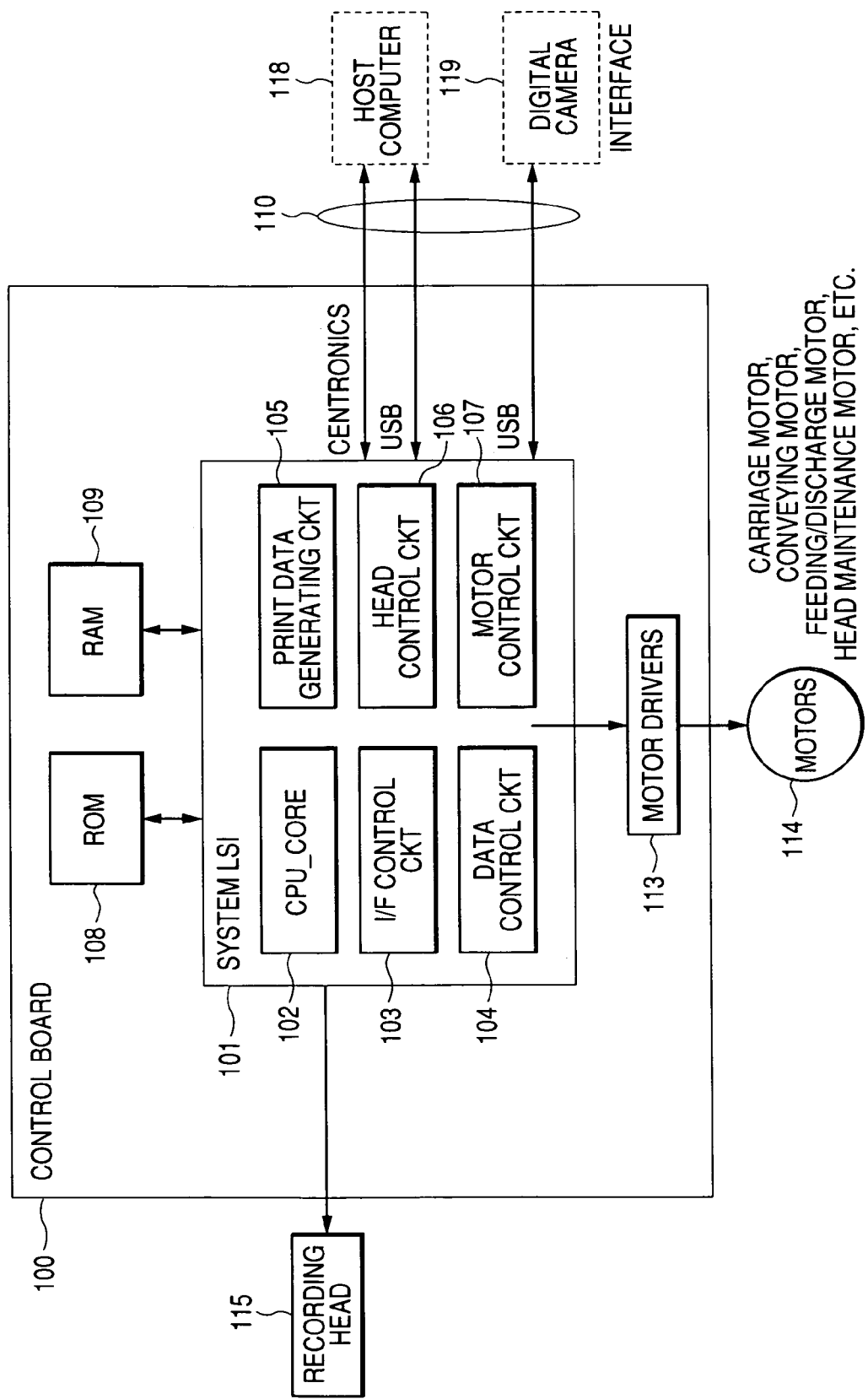
FIG. 1 is a block diagram schematically showing the construction of a recording apparatus in first, second and third embodiments.

FIG. 1 is a block diagram schematically showing an example of the construction of a recording apparatus according to a first embodiment. In FIG. 1, the reference numeral 100 designates a control board on which electric parts for effecting the control of the recording apparatus are mounted.

The reference numeral 101 denotes a system LSI. This system LSI includes a CPU_CORE (or CPU) 102, an interface control circuit 103, a data control circuit 104, a print data generating circuit 105, a recording head control circuit 106 and a motor control circuit 107.

The interface control circuit 103 effects the transmission and reception of data with a host computer 118 and a digital camera 119 through an interface 110. This data is stored in a reception buffer provided in a RAM 109.

The data control circuit 104 effects the read/write control of the data to the reception buffer and a print buffer. The print data generating circuit 105 generates print data from the received data.

The recording head control circuit 106 forwards the generated print data to a recording head 115 and effects the discharge control of the ink of the recording head.

The motor control circuit 107 outputs a control signal to a motor driver 113 for driving motors 114. The motors include a carriage motor for causing a carriage carrying the recording head 115 thereon to scan, a conveying motor for effecting the conveyance of a recording medium, a feeding/discharge motor for effecting the feeding and discharge of the recording medium, and a maintenance motor for effecting the cleaning (maintenance) of the recording head.

The reference numeral 108 designates a ROM storing therein a program for controlling the printer.

The printing operation of the recording apparatus will now be described. When the recording apparatus receives image data or the like from the host computer 118 through the interface 110, the received data is once stored in the reception buffer allotted to the RAM 109 from the interface control circuit 103 of the system LSI 101 by the data control circuit 104.

The received data stored in the reception buffer is subjected to command analysis, and the image data is subjected to print data processing by the print data generating circuit 105, and then is stored in the print buffer allotted to the RAM 109.

When a necessary amount of data is stored in the print buffer, print data is read out from the print buffer at predetermined timing by the recording head control circuit 106, and is forwarded to the recording head 115.

Further, a driving pulse (driving signal) is outputted to the recording head 115 by the recording head control circuit 106 while the recording head is moved in a main scanning direction. Thereby, the printing operation is performed and an image is formed on the recording medium (e.g. recording paper).

The recording operation of the recording head 115 is performed by the carriage motor, the conveying motor and the feeding/discharge motor being driven by the motor control circuit 107 through a motor driver 113.

Again in a case where data from the digital camera 119 has been received, image processing such as a binarizing process is effected, whereafter the generation of the print data is effected and processing similar to the above-described processing is effected, whereby the recording (printing) operation is performed.

Power source supplying means (power source supplying circuit) will now be described with reference to FIG. 2. The reference numeral 201 denotes the power supply of the recording apparatus. In the present embodiments, the power supply outputs of two systems, i.e., VM which is a power supply for driving the motors, and VH used for the ink discharge of the recording head, are effected.

A producing means of power supply for logics 202 for supplying power to the system LSI, the ROM and the RAM is equipped with a step-down type of DC/DC converter, and the converter converts the voltage from the VM to output thus converted voltages.

In the present embodiment, there are produced the power supplies of three systems, i.e., 1.5 volts for operating the logic circuit of the system LSI, and 3.3 volts and 5 volts used as the input/output of the ROM, RAM and the system LSI.

The connection of the recording apparatus to the digital camera, in the present embodiment, is done by a USB interface. A signal line comprises the Vbus of power supply, D+ and D− of data lines, and GND (ground).

In the present embodiment, means for detecting the connection of an apparatus (e.g. a digital camera) provided with an image pickup element conforms to the standard of USB. Specifically, a USB device has a pull-up resistor at either of the data lines, and the connection can be detected by the device being connected to the port of a hub or a host and one of the data lines being pulled up to a threshold at a high side or greater for a period of 2.5 μs (microseconds) or longer.

Any USB device, when first connected, does not require electric power greater than 100 mA. The host (USB host) usually requires configuration information of the USB device, examines the function of a device to be connected and effects the making of the device.

At that times the host, when it detects the mounting of a USB device using a bus power supply, effects the estimate of the consumed electric power of the device.

The present embodiment is designed such that in a case where a digital camera activated by being supplied with electric power through an interface is connected, when the connection (connected state) is detected by the USB host circuit of the recording apparatus, the recording operation is performed with the consumed electric power (electric power load) of the recording apparatus suppressed. Or it is designed such that when the detachment (non-connected state) of a USB cable is detected, the suppression of the consumed electric power of the recording apparatus is stopped and the state before the connection is restored.

That is, design is made such that whether the digital camera and the recording apparatus are connected together is detected and control is changed depending on the result of the detection.

Description will now be made of an example of the control of suppressing the consumed electric power of the recording operation. This control is effected so as to perform the recording operation in accordance with the amount of recording data (recording duty) received from the host apparatus. When the amount of recording data is great, the control of decreasing the number of nozzles used in one cycle of scanning is executed. Thereby, the electric power consumed by the recording head is suppressed.

First, in the recording medium, the area of a print buffer corresponding to a recording area capable of recording by one scan of the recording head is divided into a plurality to thereby form a plurality of blocks, and a record duty (represented also as a record duty value or the value of recording density) in each block is calculated (detected) prior to the start of the recording scan of the recording head.

Next, a threshold value (the value of record duty or recording density) recordable during the recording scan is obtained on the basis of the capability (electric power supply amount) of the power supply of the recording apparatus. Comparison between this threshold value and the record duty of the recording data is then effected.

If as the result of this comparison between the threshold value and the record duty of the recording data, the threshold value is greater than the record duty of the recording data, ordinary scanning and recording are effected. If, however, the record duty of the recording data is greater than the threshold value, the number of nozzles (the number of nozzles for discharging the ink therethrough) used in one cycle of scanning is decreased and the recording operation is performed.

When for example, it is detected that the digital camera has been connected, the above-mentioned threshold value is changed to a predetermined threshold value. In order to supply electric power from the power supply of the recording apparatus to the digital camera, the consumed electric power of the recording operation can be made smaller than the consumed electric power of the recording operation when electric power supply is not effected to the digital camera.

Figure 3A:
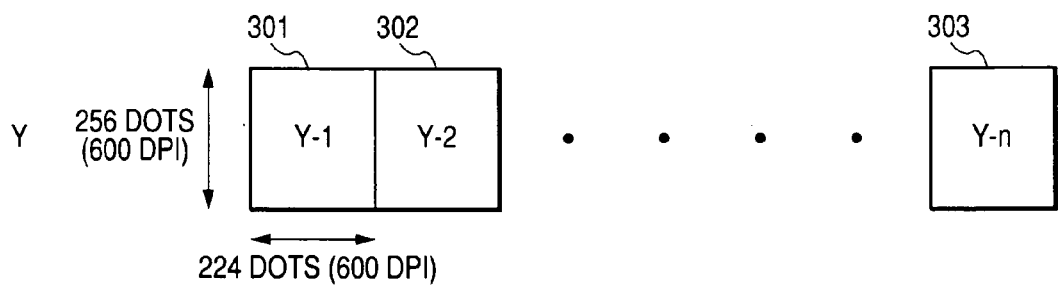
FIGS. 3A, 3B and 3C are illustrations of the detection unit of a recording duty.
Figure 3B:
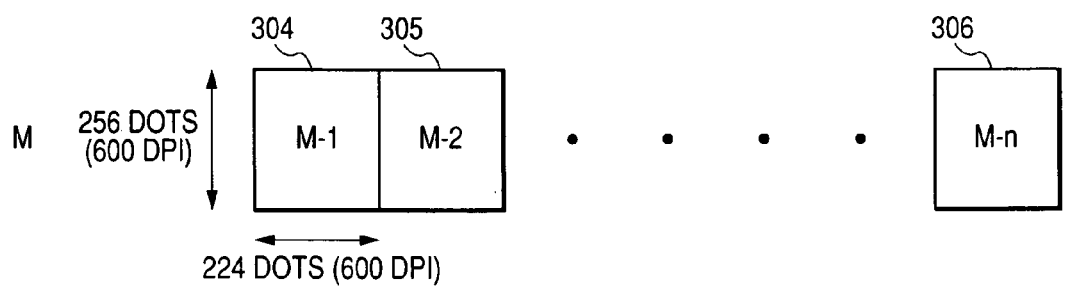
Figure 3C:
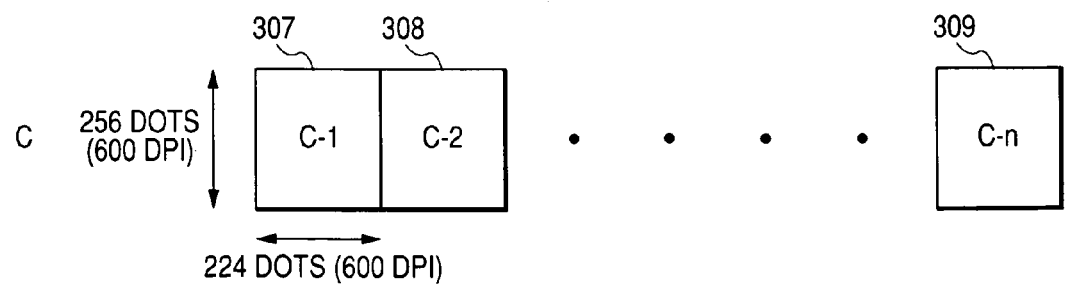

A method of detecting the record duty will now be described with reference to FIGS. 3A to 3C. In the present embodiment, description will be made of a case where color recording using yellow (Y, FIG. 3A), magenta (M, FIG. 3B) and cyan (C, FIG. 3C) of the inks the recording apparatus has is effected. Also, it is to be understood that the recording head in the present embodiment has resolution of 600 DPI for each color and has 256 nozzles.

An area corresponding to the nozzle width for Y×one scan is divided into a plurality of blocks, and at that block unit, the record duty of the recording data is calculated (detected). The print data by which the discharge of the ink is actually effected is '1' in terms of binary data and therefore, print data which is '1' is counted. This data '1' is so-called dot data.

In the present embodiment, as indicated at 301 to 303, the area is divided into blocks of 256 dots in a sub-scanning direction×224 dots in the main scanning direction, and the record duty is detected. The area of these blocks need not be of this size, but can be a unit at which a change in the record duty can be detected as the load of the power supply.

As regards the blocks to be counted, there may be adopted a method of making the block size thereof still smaller, setting still a smaller block area within the range of 256 dots in the sub-scanning direction×224 dots in the main scanning direction, calculating the record duty in that small area, adding the calculated value, and detecting the record duty.

The main scanning direction is the scanning direction of the recording head. The sub-scanning direction is the conveying direction of the recording medium, and the arrangement direction of the nozzles of the recording head.

Also the recording data corresponding to the nozzles for magenta (M) and cyan (C), similarly to yellow (Y), are divided into blocks as indicated by 304 to 306 and 307 to 309, respectively, and the record duties thereof are calculated (detected).

The calculation (detection) of these record duties is effected before the start of each scan for recording.

Figure 4A:
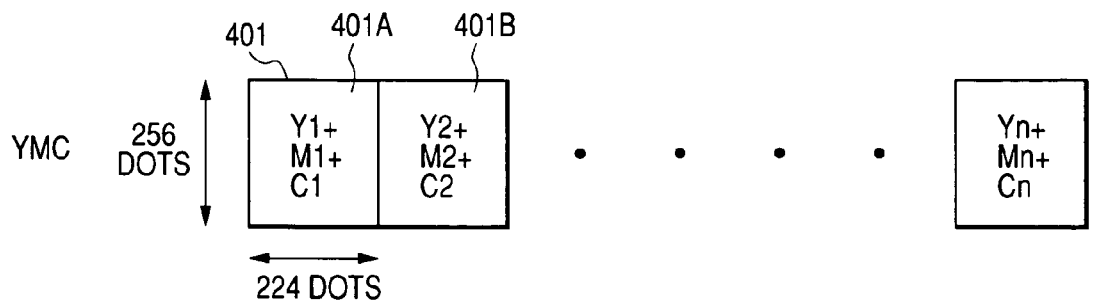
FIGS. 4A, 4B and 4C are illustrations of the comparison of the recording duty.
Figure 4B:
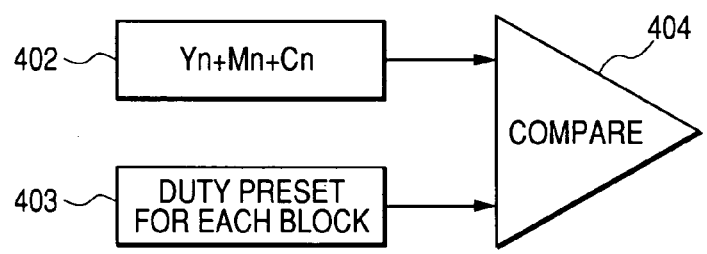
Figure 4C:
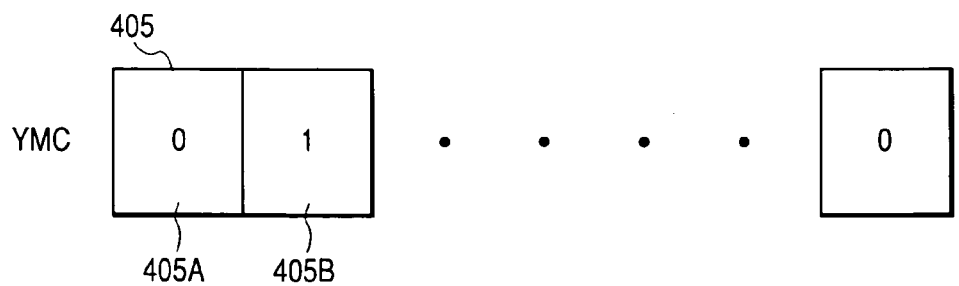

Reference is now had to FIGS. 4A to 4C to describe the comparison between the record duty obtained by the detecting means for detecting the record duty and the threshold value. This threshold value is set by threshold value setting means.

In each block of 256 dots at the height×224 dots at the width, the record duties (the count values of dot data) for Y, M and C are added. The result 402 of this addition and a duty 403 preset for each block are compared with each other by a comparator 404 (FIG. 4B). The result 405 of this comparison is outputted.

As shown in FIG. 4A, a block 401 has a block 401A, a block 401B, . . . arranged in the main scanning direction. Regarding the respective blocks, a comparing process is carried out in succession. The result of this is outputted for each block.

If as the result of this comparing process, the record duty (value) obtained by the detecting means is greater than the duty 403 preset for each block, a flag is set to '1'. If the former is smaller than the latter, the flag is set to '0'.

This flag, as shown in the table 405 of FIG. 4C, is provided correspondingly to each block. For example, 405A is the flag of a block 401A, and 405B is the flag of a block 401B. If this flag is referred to, whether the record duty is greater than the duty 403 preset for each block can be judged with respect to the recording data of each block.

The duty 403 preset for each block is the record duty recordable during the above-described recording scan, and the threshold value.

This threshold value is a value (first value) predetermined on the basis of a supply capability of power source of the recording apparatus (power supply specification), the consumed electric power of the mounted recording head, the consumed electric power of the motors, etc., and also an electric power value (or a numerical value corresponding to the electric power value) consumable to drive during each recording scan. This threshold value is also a control parameter for suppressing the consumed electric power.

This duty 403 preset for each block is carried out, for example, when the power ON of the recording apparatus or when the mounting of the recording head.

If in the recording of one scan, any one of the above-mentioned flags is '1' with respect to the above-described block, it represents that the consumed amount (electric power load amount) for the recording operation is over the supply amount of the power supply of the recording apparatus, and in this case, a supplied voltage to the recording head and a supplied voltage to the motor drop and as a result, an image recorded is deteriorated or a desired recording operation cannot be performed.

Accordingly, if in the blocks corresponding to one scan, any one of the flags is set to '1', the recording operation is changed in order to mitigate the load of the power supply. For example, the process of thinning the data to be recorded, the process of increasing the thinning rate of the data to be recorded, the process of increasing the frequency of the recording scans for a same area of the recording medium or the like, is carried out.

The process of thinning the data to be recorded is, for example, the process of decreasing the amount of data used for one cycle of scan recording by the use of a mask pattern. The process of increasing the thinning rate of the data to be recorded is, for example, the process of using a mask pattern of 20% thinning, instead of a mask pattern of 10% thinning. The process of increasing the frequency of the scans for a same area of the recording medium is, for example, the process of completing an image by three cycles of scan recording, instead of completing an image by one cycle of scan recording of a predetermined area.

Figure 5:
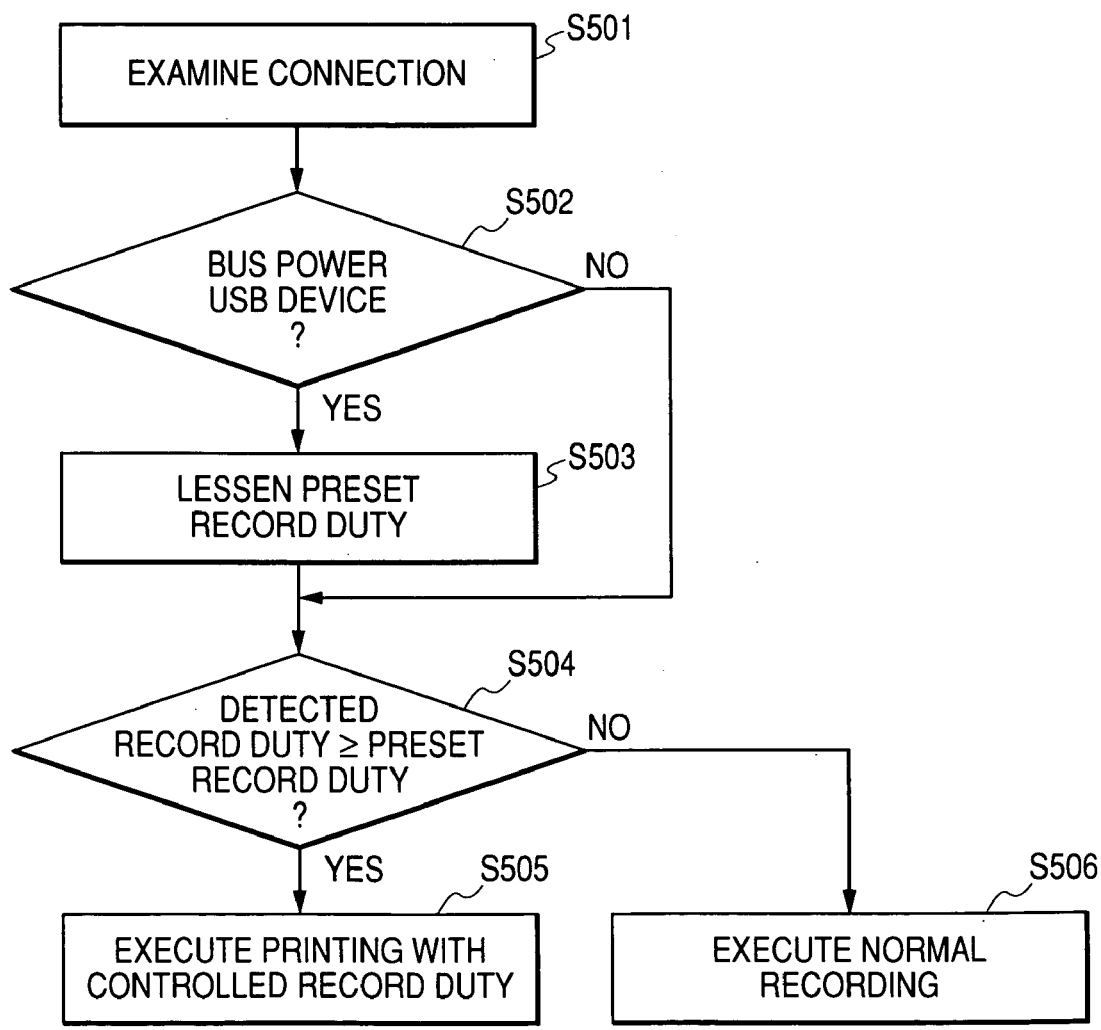
FIG. 5 is a flow chart of the first embodiment.

FIG. 5 shows a flow chart of the present embodiment. The USB host of the recording apparatus conforms to the standard of USB, and detects that a USB device (function) such as a digital camera has been connected (S501).

Further, the USB host of the recording apparatus demands configuration information from the connected function, and examines the facilities of the device. As one of them, it confirms whether the USB device which is the function is a bus power device activated by being supplied with electric power from Vbus (requiring the supply of electric power from Vbus) (502).

If the USB device which is the function is a bus power device, the duty 403 preset for each block is changed to a different value (a second value) (S503). That is, the control parameter for suppressing the consumed electric power is changed.

This second value is a value smaller than the above-mentioned first value. The consumed electric power of a recording operation performed when the record duty value (detected record duty value) is greater than this second value is smaller than the consumed electric power of a recording operation performed when the record duty value (detected record duty value) is greater than the first value.

For example, when the record duty value is greater than the first value, the rate at which the data to be recorded is thinned is 25%, but when the record duty value is greater than the second value, the process of increasing the rate at which the data to be recorded is thinned to 40% is carried out. Also, as another example, when the record duty value is greater than the first value, image recording is effected (an image is completed) on a same recording area of the recording medium by two cycles of main scan recording, but when the record duty value is greater than the second value, image recording is effected (an image is completed) by three cycles of main scan recording.

If the USB device which is the function is not a bus power device, advance is made to S504. At S504, comparison between the record duty 402 detected for each block and the record duty 403 preset for each block is effected.

If any one block (in which the detected record duty in a unit block≧the record duty 403 preset for each block) exists (any one flag exists) in one scan, a recording operation with a controlled record duty is executed to thereby suppress the load to the power supply (S505).

If no block (in which the detected record duty in a unit block≧the record duty 403 preset for each block) exists (no flag exists) in one scan, the recording mode is not changed but normal printing is executed (S506).

This control shown in FIG. 5 is effected, for example, at the start of the recording operation (for each page). Also, if non-connection (state) is detected at the timing of the recording operation (for each page), the process of changing the record duty preset for each block from the second value to the first value is carried out.

Thereby, in conformity with the connected or non-connected state of the USB function such as a digital camera, the recording apparatus can perform the recording operation while keeping balance between the electric power consumption and the recording speed.

When a device activated by being supplied with electric power is connected, consumed electric power for the recording operation can be reduced and electric power supply can be effected to the device connected to the recording apparatus.

The connection detecting process may be carried out for each main scan recording operation. That is, even in a case where the USB function such as a digital camera has been connected when recording data requiring a great electric power load is being recorded, the consumed electric power can be further reduced.

Second Embodiment

In a second embodiment, the schematic construction of the recording apparatus and the power source supplying means are the same as those in the first embodiment and therefore need not be described.

Figure 6:
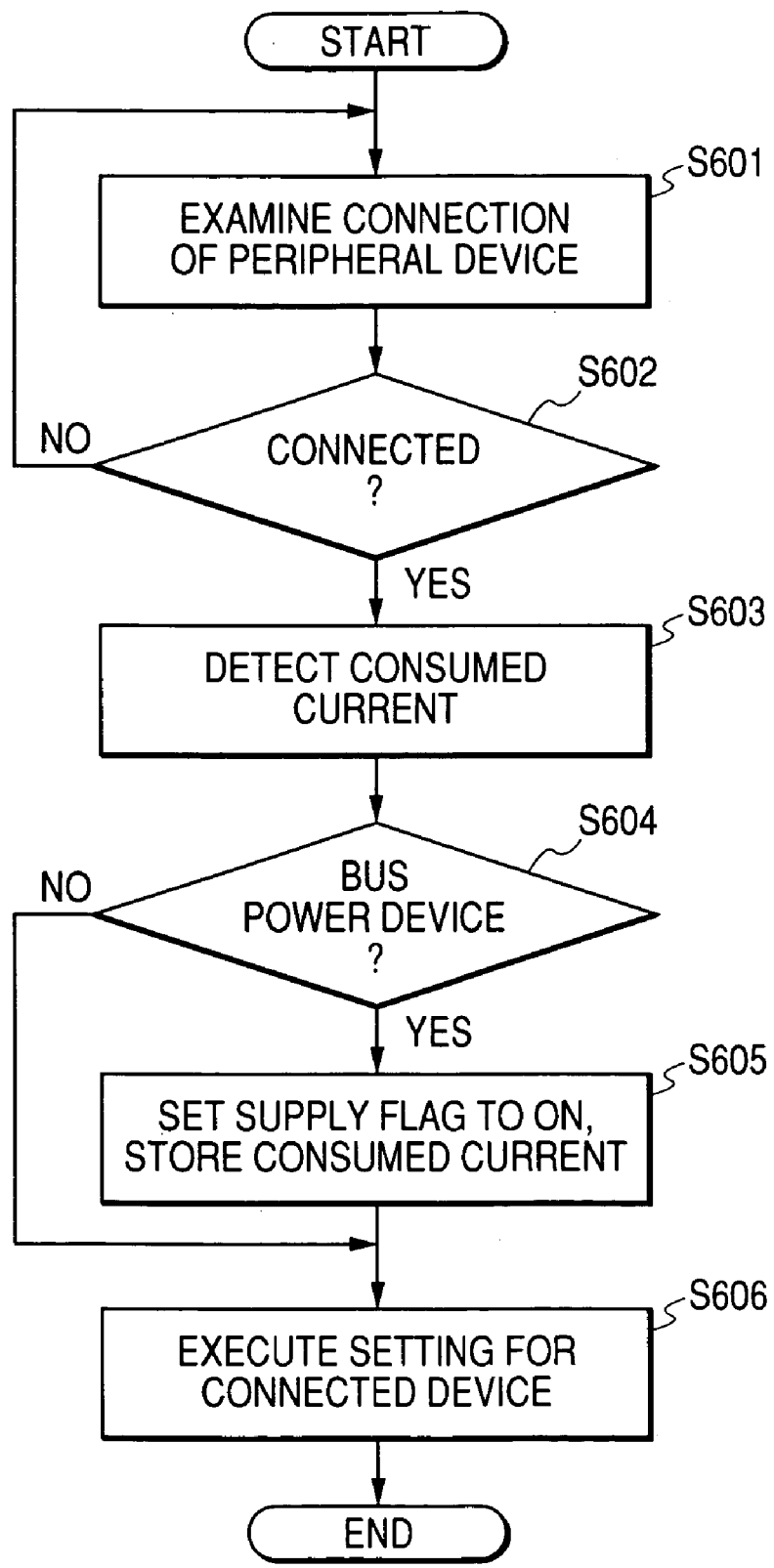
FIG. 6 is a flow chart of the second embodiment.

The operation of detecting the connection of the peripheral device (USB device) in the present embodiment will hereinafter be described with reference to the flow chart of FIG. 6. The processing of each step shown in FIG. 6 is executed, for example, by the interface control circuit of FIG. 1.

First, in order to judge whether the peripheral device (USB device) is connected, the voltage level of the data line is examined (step S601). If the voltage level of either one of the data lines is a threshold value voltage or greater, at a step S602, it is judged that the peripheral device is connected, and when the connection is detected, the transmission of configuration information is demanded of the peripheral device and the consumed current of the peripheral device is examined (step S603). On the other hand, if at the step S602, it is judged that the peripheral device is not connected, return is made to the step S601, where the voltage level of the data line is again examined.

From the consumed current of the peripheral device examined at the step S603, whether the peripheral device is a bus power device is judged (step S604). If it is a bus power device, a supply flag representing that the supply of electric power should be effected is set to ON, and the value of the consumed current of the peripheral device is stored in a predetermined memory area (e.g. the RAM 109) (step S605), and the supply of electric power is started. At the same time, setting for the connected peripheral device is effected (step S606). On the other hand, if at the step S604, it is judged that the connected peripheral device is not a bus power device, the supply of electric power is not effected, but at the step S606, setting for the connected peripheral device is effected.

FIG. 7 is a flow chart showing the operation during the execution of the recording operation in the present embodiment with respect to the setting of a recording method. The processes of respective steps shown in FIG. 7 are executed, for example, by controlling each block in which the CPU-_CORE 101 of FIG. 1 is concerned.

Whether a record command has been received from a host computer or a connected peripheral device is judged (step S701), and if the record command has been received, whether the supply flag for representing the electric power supply to the peripheral device which is set at the step S605 of FIG. 6 is ON is examined (step S702). On the other hand, if at the step S701, the record command is not received, whether the record command has been received is judged again at a predetermined interval.

If at the step S702, it is judged that the supply flag is ON, whether multi-pass recording is set as the recording method is judged (step S703). If the multi-pass recording is not set, the multi-pass recording is set (step S704), the number of used nozzles in one pass and the number of passes are determined on the basis of the consumed current value stored at the step S605 of FIG. 6 (step S705).

If at the step S703, the recording method is set to the multi-pass recording, the step S704 is not executed, but the step S705 is executed.

On the other hand, if at the step S702, it is judged that the supply flag is not ON, that is, electric power supply to the peripheral device is not effected, a value about a recording method designated by the record command (a control value for the recording operation) is set (step S706).

Recording is executed in accordance with the recording method (the number of used nozzles, the number of passes, etc.) set in the manner described above.

Third Embodiment

In a third embodiment, the schematic construction of the recording apparatus and the power source supplying means are the same as those in the first and second embodiments and therefore need not be described.

Figure 9A:
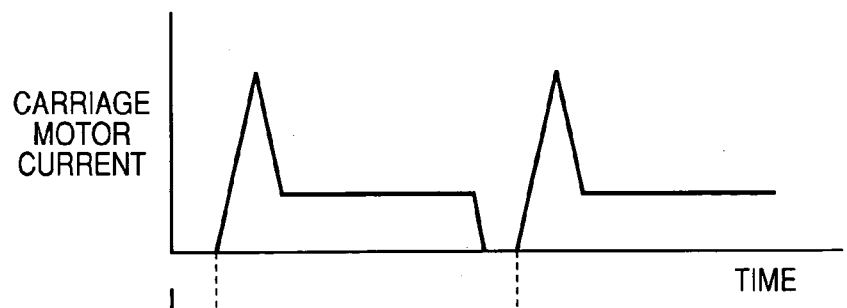
FIGS. 9A, 9B and 9C show electric currents consumed by a carriage motor and a conveying motor according to the prior art.
Figure 9B:
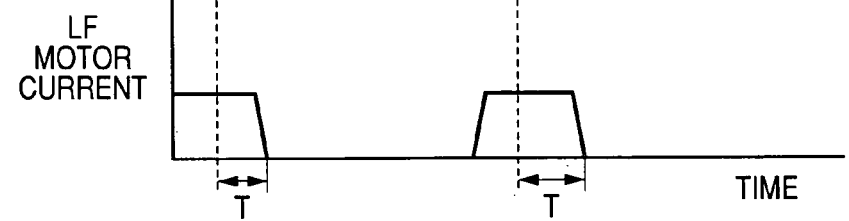
Figure 9C:
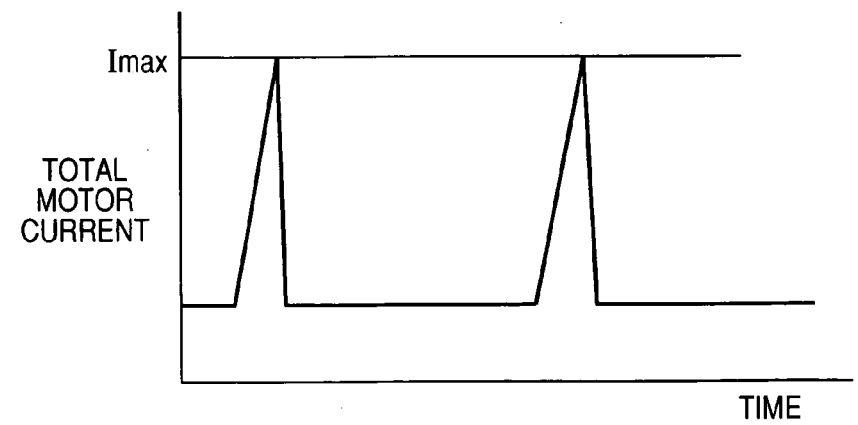

FIGS. 8A to 8C and FIGS. 9A to 9C are graphs briefly illustrating the relation of a variation with time (the axis of abscissas) in the consumed current value (the axis of ordinates) about the recording operation. These FIGS. 8A to 8C and FIGS. 9A to 9C show that the carriage motor is driven and the carriage scans, whereafter the recording paper is conveyed by the driving of the conveying motor (the amount of this conveyance corresponds to the number of nozzles used for recording), and thereafter the carriage motor is again driven and the carriage scans. This operation is repeated, whereby an image is formed on the recording paper. FIGS. 8A to 8C show the control in the present embodiment, and FIGS. 9A to 9C show the control in the prior art.

FIGS. 8A and 9A show variations in the consumed current of the carriage motor when the recording operation is performed. In these figures, the consumed current reaches its peak after a predetermined time has elapsed after the driving of the carriage motor has been started. FIGS. 8B and 9B show variations in the consumed current of the conveying motor (LF motor). FIGS. 8C and 9C show variations in the consumed current value of the two in total. In other words, they correspond to the sum of the consumed electric power amounts of the two motors.

As can be seen from FIGS. 9A and 9B, the driving of the carriage motor is started before the driving of the conveying motor (LF motor) is terminated. Accordingly, in a period T, the carriage motor and the conveying motor are being driven at a time. The consumed current reaches its peak after a predetermined time has elapsed after the driving of the carriage motor has been started. Accordingly, as shown in FIG. 9C, the peak of the sum of the consumed current of the carriage motor and the consumed current of the conveying motor becomes Imax.

On the other hand, as can be seen from FIGS. 8A and 8B, when the driving of the carriage has been started, the conveying motor is stopped (is in a non-driven state). Accordingly, as shown in FIG. 8C, the peak of the consumed electric power can be made lower than Imax shown in FIG. 9C. That is, the consumed electric power of the recording apparatus can be suppressed.

The consumed electric power of the recording apparatus includes, besides the consumed electric power shown in FIGS. 8C and 9C, the consumed electric power for driving the recording head and the consumed electric power to be supplied as the USB host.

When a digital camera or the like is connected to the recording apparatus, the control of changing over the driving timing so as not to drive the carriage motor and the conveying motor at a time is effected, whereby the driving timing of the motors can be dispersed.

Figure 10:
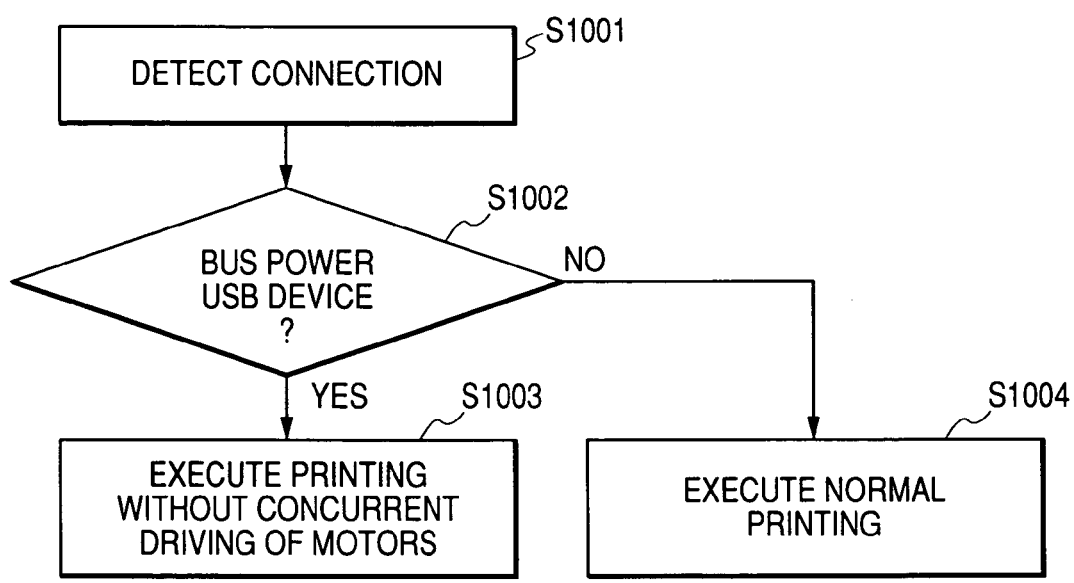
FIG. 10 is a flow chart of the third embodiment.

FIG. 10 shows a flow chart of the present embodiment. This control is effect, for example, at a print job unit (one-page unit or plural-page unit), and is effected before the start of the recording of that job. The recording apparatus operates as the USB host. The recording apparatus conforms to the standard of USB, and detects that a USB function such as a digital camera has been connected (S1001). Further, the USB host of the recording apparatus demands configuration information from the connected function, and examines the facilities of the device. As one of them, whether the USB device which is the function is a bus power device activated by being supplied with electric power from Vbus is confirmed (S1002).

If the USB device which is the function is a bus power device, there is provided an operating mode in which the carriage motor and the conveying motor are not driven at a time (S1003). Therefore, the driving start timing of one (or both) of the carriage motor and the conveying motor is changed. If the USB device which is the function is not a bus power device, the printing (recording) mode is not changed, but a normal printing mode is adopted (S1004). That is, when the recording operation is to be performed, the carriage motor and the conveying motor are driven at a time. For example, at the timing whereat deceleration control has been started in order that the carriage motor is stopped, the driving of the conveying motor which is in its stopped state is started. Or at the timing whereat deceleration control has been started in order that the conveying motor is stopped, the driving of the carriage motor which is in its stopped state may be started.

In the present embodiment, the connection to a digital camera is done by a USB interface. A signal line comprises the Vbus of power source, the D+ and D− of date lines, and GND (ground).

In the present embodiment, means for detecting the connection of the digital camera conforms to the standard of the USB. Specifically, the USB device has a pull-up resistor on one of the data lines, and can be detected by the device being connected to a hub or the port of the host, and one of the data lines being pulled up to a threshold at a high side or greater for 2.5 μs (microseconds) or longer.

Fourth Embodiment

While in the third embodiment, at the step S1003 of FIG. 10, the mode is the operating mode in which the carriage motor and the conveying motor are not driven at a time (are prohibited from being driven at a time), use may be made of the control of shortening the time for which the carriage motor and the conveying motor are driven at a time (for example, shortening the period T of FIG. 9B to ¼). That is, during a period for which the consumed electric power of the carriage motor is relatively low (e.g. during a predetermined period from after the start of driving), the driving timing is changed so as to drive the conveying motor.

For example, after the driving of the conveying motor has been started, the control of delaying the timing for starting the driving of the carriage motor is effected (that is, the driving start time of the carriage motor after the start of the driving of the conveying motor is made great). This can be applied when for example, the acceleration driving time of the carriage motor is long (when much time is required for the consumed electric power of the carriage motor to increase). Thereby, the throughput can be prevented from being reduced more greatly than when the concurrent driving of the carriage motor and the conveying motor is prohibited.

The other description is the same as the contents of the above-described embodiments and therefore need not be made. While it is to be understood that the timing of this connection detection shown in FIG. 10 is effected, for example, at a print job unit (one-page unit or plural-page unit), this is not restrictive, but this timing may be effected at the start of the recording operation. Also, when the interval of one main scan recording operation is long, the connection detecting process may be carried out at one main scan recording unit.

Thereby, in conformity with the connected or non-connected state of the USB function such as a digital camera, the recording apparatus can perform the recording operation while keeping balance between the electric power consumption and the recording speed.

As described above, in conformity with the connected/non-connected state of an electric device such as a digital camera, the operation timing of the driving means of the recording apparatus can be changed to thereby suppress the peak of the power supply load, and yet suppress a reduction in the throughput. Thereby, electric power supply can also be effected to the connected electronic device, and a reduction in the cost of the power supply can also be realized.

Also, while the driving timing of the motors has been described with respect to the relation between the conveying motor and the carriage motor, these motors are not restrictive, but application may also be made to the driving of other motors such as the feeding/discharge motor and the maintenance motor.

Fifth Embodiment

A fifth embodiment will hereinafter be described in detail with reference to the drawings. Also, as in the above-described embodiments, description will be made with an ink jet recording apparatus of a serial scan type as an example of the recording apparatus, and with a digital camera as an example of the connected device.

Figure 11:
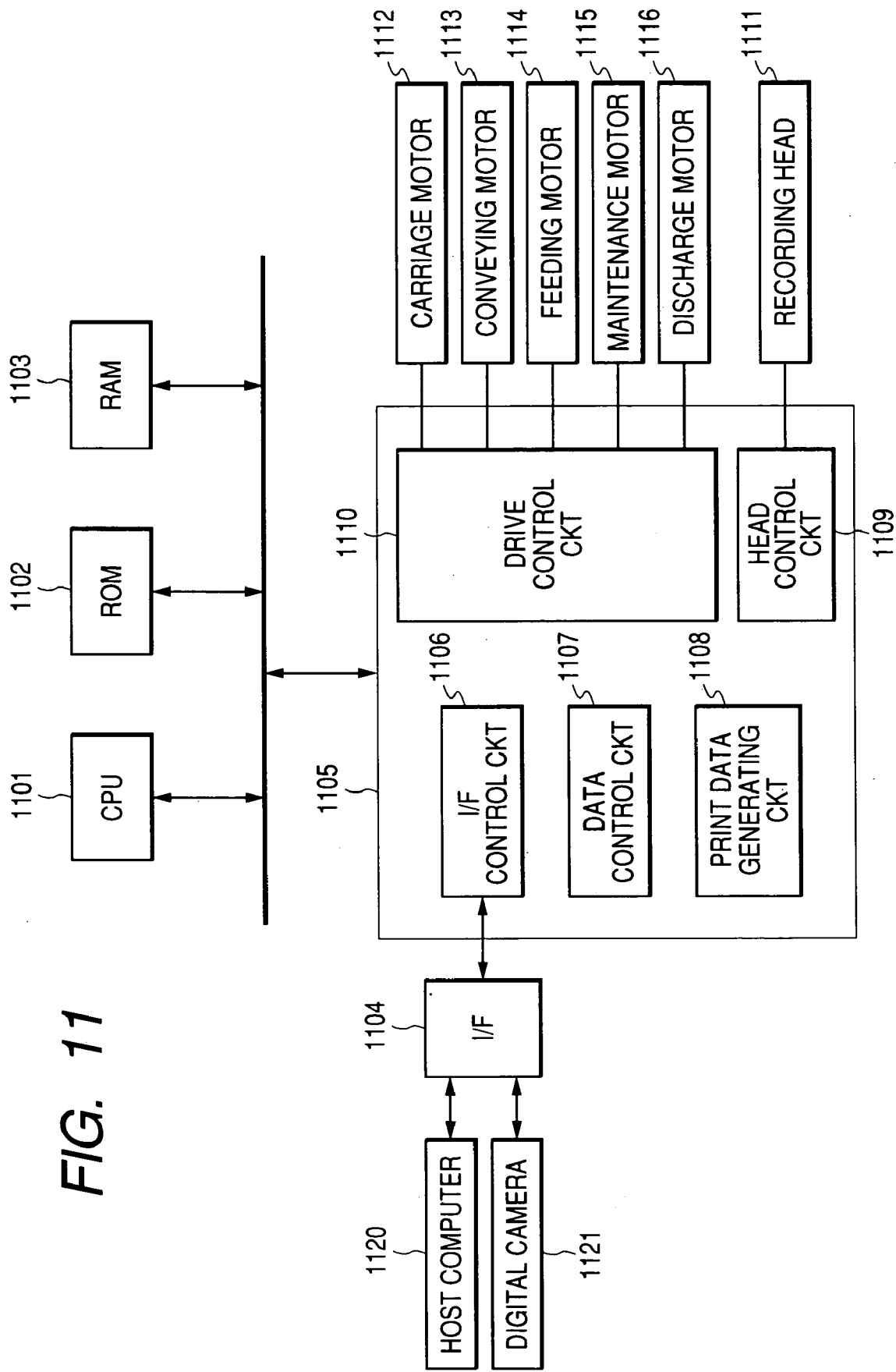
FIG. 11 is a block diagram regarding a recording apparatus according to a fifth embodiment.

FIG. 11 is a block diagram schematically showing the construction of a recording apparatus according to the present embodiment.

The reference numeral 1101 designates a CPU, the reference numeral 1102 denotes a ROM storing therein a control program to be executed by the CPU 1101 and other table data or the like, and the reference numeral 1103 designates a RAM. This RAM 1103 is provided with a reception buffer, a print buffer, etc.

The functions of the reception buffer and the print buffer are the same as those described in the first embodiment and therefore need not be described.

The reference numeral 1105 denotes an ASIC which is a control portion for controlling the operation of the recording apparatus together with the CPU. The reference numeral 1104 designates an interface which effects the transmission and reception of data from a host computer 1120 and a digital camera 1121.

The ASIC 1105 includes an interface (I/F) control circuit 1106 for controlling the interface (I/F) 1104, a data control circuit 1107 for effecting the read/write control of data to the reception buffer and the print buffer, a print data generating circuit 1108 for effecting the generation of print data, a recording head control circuit 1109 for forwarding the print data generated by the print data generating 1108, and effecting the discharge control of the ink of a recording head, and a motor control circuit (drive control circuit) 1110 for controlling the driving of motors.

The motor control circuit 1110 controls the driving of a carriage motor (DC motor) 1112 for causing a carriage carrying a recording head 1111 thereon to scan, a conveying motor (DC motor) 1113 for effecting the conveyance of a recording medium (e.g. recording paper), a feeding motor (stepping motor) 1114 for effecting the feeding of the recording medium, a maintenance motor (stepping motor) 1115 for effecting the cleaning, etc. of the recording head, and a discharge motor (DC motor) 1116 foe effecting the discharge of the recording medium.

The printing operation of the recording apparatus according to the present embodiment will now be described. When the recording apparatus receives image data or the like from the host computer 1120 through the interface 1104, the image data or the like is stored in the reception buffer by the interface control circuit 1106 and the data control circuit 1107 of the ASIC 1105. The received data stored in the reception buffer is subjected to command analysis, and the image data is subjected to print data processing by the print data generating circuit 1108. The image data subjected to this print data processing is then stored in the print buffer.

When a predetermined amount of data is stored in the print buffer, the print data is read out from the print buffer at predetermined timing by the recording head control circuit 1109, and is forwarded to the recording head 1111.

A driving pulse is given to the recording head 1111 by the recording head control circuit 1109 while the recording head scans (moves) relative to the recording medium, whereby the ink is discharged from the recording head in conformity with the print data, and an image is formed on the recording medium.

As described above, the scanning by the recording head 1111, and the feeding, conveyance and discharge of the recording medium are by the carriage motor 1112, the feeding motor 1114, the conveying motor 1113 and the discharge motor 1116 being driven by the motor control circuit 1110.

Also in the data reception from the digital camera 1121, image processing such as a binarizing process is effected by the print data generating circuit 1108, whereafter the generation of the print data is effected and a recording operation is performed by a similar process.

Figure 12:
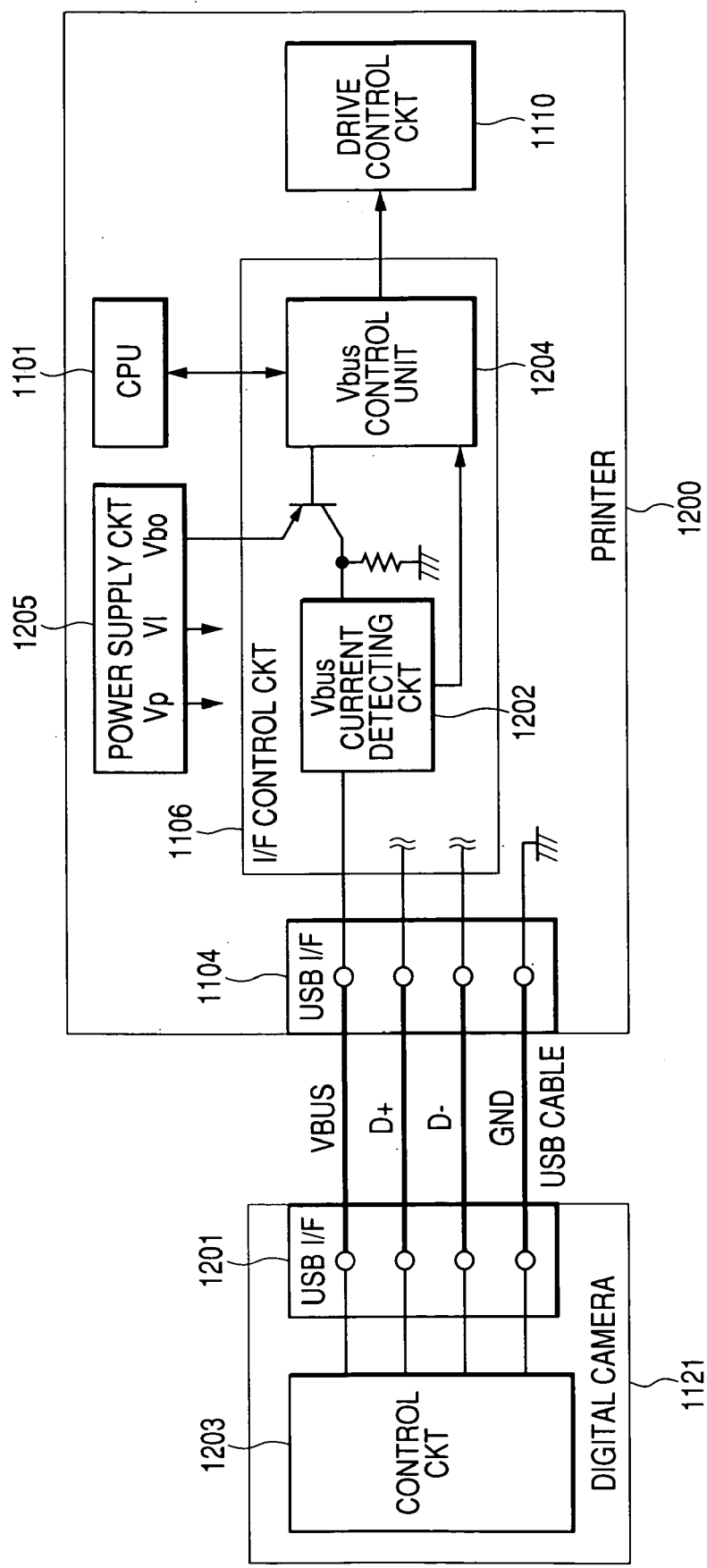
FIG. 12 is an illustration of power source supplying means in the fifth embodiment.

FIG. 12 illustrates the interface control circuit 1106 and circuits related thereto when as an example of an image pickup element, a digital camera is connected to the printer through a USB cable.

The digital camera 1121 is provided with a USB as an interface 1201, and a control circuit 1203 for controlling the operation of the digital camera.

Also, the interface 1104 in the printer 1200 is provided with ports not shown, such as a parallel port, an IEEE 1394 port, besides the USB. The interface control circuit 1106 includes a Vbus current detecting circuit 1202 for detecting the current of Vbus, a Vbus control portion 1204, etc., and can switch on and off a source voltage Vbo for Vbus by a switch. The reference numeral 1205 designates a power supply circuit which outputs a voltage Vp for driving the motors and the recording head by a power supply obtained from the outside, a voltage Vl for driving the CPU and the ASIC, a voltage Vbo for the control of Vbus, etc.

When here, the digital camera 1121 is connected to the printer 1200 through the USB cable, transmission and reception by a predetermined communication protocol along the standard of the USB are effected, and the switch is closed by the Vbus control unit 1204 and the voltage Vbo is given to the Vbus.

At this time, the digital camera 1121 demands a current of 100 mA or less, or demands a current of 100 mA or greater and 500 mA or less, and this is detected by the Vbus current detecting circuit 1202 and the result of the detection is transmitted to the Vbus control unit 1204.

If the current value supplied to the digital camera 1121 is 100 mA or less, a recording operation (for description, represented as e.g. a normal mode) is performed without the mode of the recording operation being changed over.

If the current value supplied to the digital camera 1121 is 100 mA or greater and 500 mA or less, the Vbus control unit 1204 transmits information to the CPU 1101 and at the same time, also transmits information to the motor control circuit 1110. The motor control circuit 1110 which has received this information changes over its operation mode from the normal mode to a silent mode. This silent mode is a mode which does not consume the current.

The silent mode will be described here. The performance required of the recording apparatus in recent years includes silencing. Due to the higher speed of the recording operation, the working sounds during the feeding of the medium, during the conveyance of the medium and during the discharge of the medium tend to become great and therefore, particularly in the printing in the nighttime or at a quiet place, such sounds sometimes become offensive to the user's ear and the ambient environment.

So, the function of lowering the working sounds during the recording operation more than in the normal mode is the silent mode. The changeover to this silent mode is set for the recording apparatus by effecting the setting of mode changeover from the host device using a software such as a printer driver by means of a user to thereby transmit the result of this setting from the host to the recording apparatus through the interface. Also, by the setting of a printer driver, it is also possible to set a time zone for making the silent mode effective. Thereby, in the nighttime, the recording apparatus can be operated in the silent mode.

In the present embodiment, further, the changeover control between the silent mode and the normal mode is effected in accordance with the current value supplied to the digital camera 121.

Now, as regards the silent mode, when driving is effected by the use of a stepping motor, in order to reduce the noise when the operations of feeding, conveying and discharging the recording medium are performed, or the noise when the cleaning operation and the protecting operation (capping operation) for the recording head are performed, the driving condition of the stepping motor is changed, for example, during the feeding operation.

Specifically, with regard to the driving curve of the stepping motor, the pulse rate given to the motor within a predetermined time is greatly lowered to thereby reduce the driving current value. For example, the control of reducing (suppressing) the driving current value to about 70% of the driving current value in the normal mode is effected.

That is, this can also be said to be a mode for suppressing the consumed current during the operation. Similar control is also applied to during the conveyance and discharge of the recording medium to thereby accomplish a reduction in the working sound of the recording operation and the suppression of the consumed electric power (current amount) during the recording operation.

Figure 13:
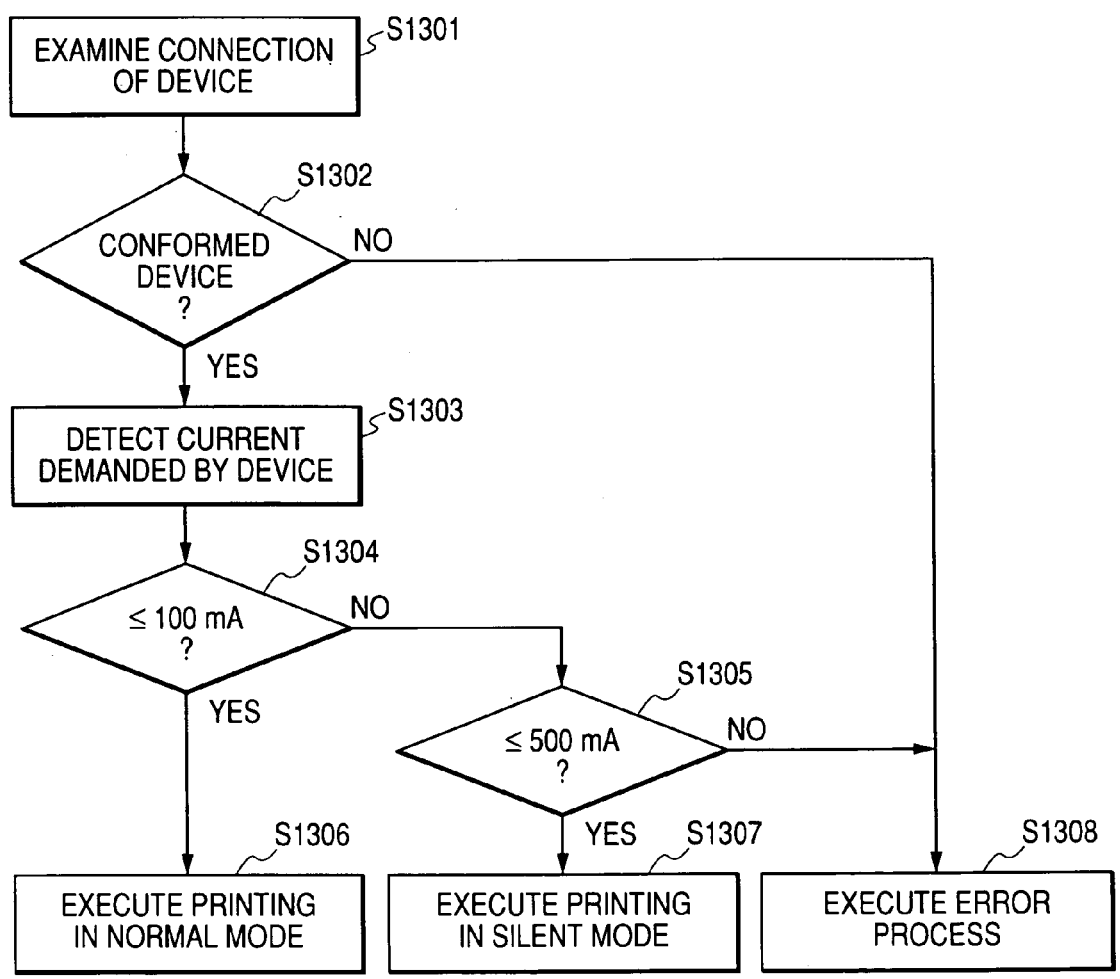
FIG. 13 is a flow chart of the fifth embodiment.

FIG. 13 is a flow chart representing the processing carried out in accordance with a current demanded by the device connected to the recording apparatus of the present invention. For example, let it be assumed that with the host computer and the printer connected together by a USB cable, the host computer and the printer are in their power supply ON state.

When at S1301, a device such as a digital camera is connected to the printer through the USB cable, transmission and reception by a predetermined communication protocol along the standard of the USB are effected, and whether the device is a corresponding device is checked up.

If at S1302, the device is not a corresponding device, the error processing of S1308 such as the switching off of the Vbus power supply and a notice to the user is executed.

If the device is a corresponding device, at S1303, a current required by the device is detected. If at S1304, the result of the detection is 100 mA or less, a recording operation is performed in the normal mode of S1306. If the result of the detection is greater then 100 mA, at S1305, whether the aforementioned current is 500 mA or less is judged.

If at S1305, the current is 500 mA or less, at S1307, changeover to the silent mode is effected. If the current is greater than 500 mA, error processing is executed at S1308.

Thus, when the connected device demands a current of power supply bus of 100 mA or greater and 500 mA or less, the controlling method for the recording apparatus is changed over to the silent mode.

That is, the motor drive control is effected with the pulse rate reduced and the current value closed tight, whereby the consumed electric power can be suppressed. The electric power corresponding to this suppressed amount can be allotted to the electric power supply to the connected device. Thus, the current demanded by the device can be supplied stably without the power supply capacity of the recording apparatus being increased, and yet the recording operation as before can be performed.

The control flow has been described above, but when a current of 100 mA or greater is demanded, design may be made such that as before, the process of forcibly switching off Vbo by a switch can be selected by a printer driver operated by a host computer.

Also, with regard to the driving condition of the stepping motor in the above-described silent mode, the changed value thereof is not restricted to 70%. Nor the stepping motor is restrictive, but the driving condition of the DC motor may be changed. For example, the driving voltage value or the duty value of the driving voltage for the DC motor can be changed.

Figure 14:
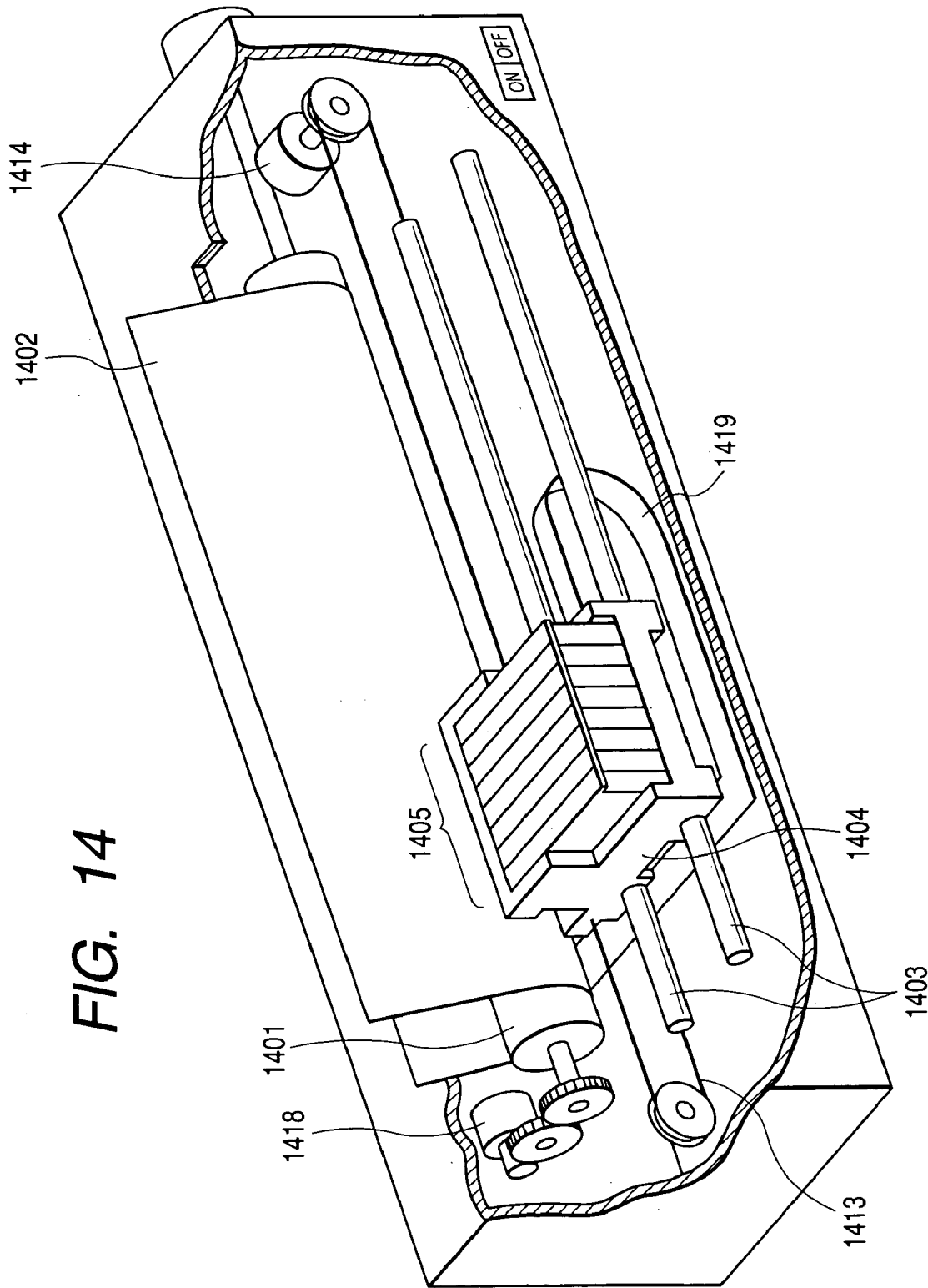
FIG. 14 is a perspective view of the recording apparatus in the first embodiment to the fifth embodiment.

Description of the Recording Apparatus Applied to the First Embodiment to the Fifth Embodiment While the first embodiment to the fifth embodiment have been described above, the recording apparatus applied to the above-described embodiments will hereinafter be described. FIG. 14 is a perspective view of the recording apparatus (printer). The reference numeral 1405 designates a recording head, and is carried on a carriage 1404 and is reciprocally movable in the longitudinal direction thereof along a shaft 1403. Ink discharged from the recording head arrives at a recording medium 1402 having its recording surface regulated by a platen 1401 with a minute interval from the recording head, and forms an image thereon.

A discharge signal is supplied to the recording head through a flexible cable 1419 in accordance with image data. The reference numeral 1414 is a carriage motor for causing the carriage to scan along a shaft 1403. The reference numeral 1413 denotes a wire for transmitting the driving force of the motor 1414 to the carriage 1404. The reference numeral 1418 designates a conveying motor coupled to the platen roller 1401 to thereby convey the recording medium 1402.

This recording head is of an ink jet type. A recording element is comprised of a driving portion and a nozzle, and the driving portion can give heat to the ink by a heater. The ink is film-boiled by this heat, and the ink is discharged from the nozzle by a pressure change caused by the growth or contraction of a bubble by the film boiling.

Other Embodiments

Also, design may be made such that when with a host computer and the printer connected together by a USB cable, the printer receives data from the host computer and starts its recording operation, the process itself of detecting whether a digital camera has been connected is not carried out. That is, during a period from the start of the recording operation of the printer until the recording operation is completed, the process of prohibiting the detection of the connection of the printer to the digital camera may be carried out. Or during the period from the start of the recording operation of the printer until the recording operation is completed, the detection of the connection of the printer to the digital camera may be effected, but as regards electric power supply, the control of completing the recording operation may be effected.

While description has been made with a digital camera taken as an example of the USB function conforming to the standard of USB, the digital camera is not restrictive, but application may also be made to an electronic device (a memory device or a communication device) which satisfies (conforms to) this USB standard. Application may also be made to a case where an electric fan or a light emitting device (light) or the like is connected.

The form of the printer is not restricted to a printer of a serial type, but may be a printer using a recording head of a full line type having a length corresponding to the maximum recording width of a recording medium on which the printer can record.

What is claimed is:

1. A recording apparatus for receiving recording data from an electronic apparatus or a host computer activated by being supplied with a power source through an interface, and performing a recording operation on a recording medium by the use of a recording head, comprising:
    power source supplying means for supplying predetermined electric power to said electronic apparatus;
    detecting means for detecting that said electronic apparatus has been connected; and
    control means for changing over the control of the recording operation when said detecting means has detected the connection or non-connection of said electronic apparatus.

2. A recording apparatus according to claim 1, further comprising:
    detecting means for, before the start of recording scan, detecting recording density for each of a plurality of blocks formed by dividing a recording area corresponding to one scan;
    comparing means for comparing a value of the recording density detected for each of said blocks with a threshold value;
    recording operation control means for changing the recording operation in accordance with a result of the detection by said comparing means; and
    setting changing means for changing said threshold value when a device provided with an image pickup element has detected connection or non-connection.

3. A recording apparatus according to claim 2, wherein the change of said recording operation changes a thinning rate of data to be recorded.

4. A recording apparatus according to claim 2, wherein the change of said recording operation changes a number of recording scans relative to the same area to be recorded on the recording medium.

5. A recording apparatus according to claim 1, wherein an interface for connecting a device provided with an image pickup element and the recording apparatus together conforms to a USB standard.

6. A recording apparatus according to claim 1, further comprising:
    scanning means for causing said recording head to scan; and
    conveying means for conveying said recording medium,
    wherein when said detecting means has detected the connection, said scanning means and said conveying means are prohibited from being driven at a time.

7. A recording apparatus according to claim 1, further comprising:
    scanning means for causing said recording head to scan; and
    conveying means for conveying said recording medium,
    wherein said control means lowers a current value supplied to said scanning means and said conveying means to a predetermined value.

8. A recording apparatus according to claim 1, wherein said control means changes a parameter for shifting from a normal recording mode to a recording mode for suppressing consumed electric power.

9. A recording apparatus according to claim 1, further comprising:
    scanning means for causing said recording head to scan; and
    conveying means for conveying said recording medium,
    wherein when said detecting means has detected the connection, if said scanning means and said conveying means are to be driven at a time, a timing for driving the two at a time is changed.

* * * * *